US006474554B2

(12) United States Patent
Tseng et al.

(10) Patent No.: US 6,474,554 B2
(45) Date of Patent: Nov. 5, 2002

(54) MULTIPLE LIGHT SENSOR MODULE POSITION SCANNING METHOD

(75) Inventors: Jen-Shou Tseng, Miao-Li Hsien; Chun-Liang Lin, Hsin-Chu, both of (TW)

(73) Assignee: UMX Data Systems Inc., Hsin-Chu (TW)

(*) Notice: Subject to any disclaimer, the term of this patent is extended or adjusted under 35 U.S.C. 154(b) by 0 days.

(21) Appl. No.: 09/840,998

(22) Filed: Apr. 25, 2001

(65) Prior Publication Data

US 2002/0063155 A1 May 30, 2002

(30) Foreign Application Priority Data

Aug. 28, 2000 (TW) ........................................ 89117354 A

(51) Int. Cl.[7] .................................................. G06K 7/10
(52) U.S. Cl. .................................. 235/454; 235/462.22
(58) Field of Search .............................. 235/454, 462.22

(56) References Cited

U.S. PATENT DOCUMENTS 6,189,793 B1 * 2/2001 Knowles et al. ............ 234/454

FOREIGN PATENT DOCUMENTS

EP 05179581 B1 * 12/1992

* cited by examiner

Primary Examiner—Harold I. Pitts
(74) Attorney, Agent, or Firm—Winston Hsu

(57) ABSTRACT

A scanner comprises a light source for illuminating a document to be scanned, and a scanning module for scanning the document. The scanning module comprises a light sensor module for receiving light from the document and generating an image signal of the document, and a light delivery module for delivering the light to the light sensor module. The light sensor module is capable of moving along a first direction and capable of being positioned on at least a first position and a second position. The method comprises: (1) positioning the light sensor module on the first position, and using the light source and the scanning module to scan a reference picture to obtain a first reference image signal, (2) positioning the light sensor module on the second position, and using the light source and the scanning module to scan the reference picture to obtain a second reference image signal, (3) positioning the light sensor module on the first position or the second position to scan the document according to the first and the second reference image signals.

21 Claims, 8 Drawing Sheets

MULTIPLE LIGHT SENSOR MODULE POSITION SCANNING METHOD

BACKGROUND OF THE INVENTION

1. Field of the Invention

The present invention relates to image scanning methods, and more particularly, to an image scanning method that increases the probability of a quality scan.

2. Description of the Prior Art

Please refer to FIG. 1. FIG. 1 is a diagram of a prior art scanner 10. The scanner 10 has a light source 12 for illuminating a document 14 to be scanned, a transparent panel 16 for supporting the document 14, and a scanning module 18 for scanning light from the document 14 to generate an image signal of the document 14. When performing a scan, the light source 12 and the scanning module 18 move simultaneously to scan the document 14.

As shown in FIG. 1, the scanning module 18 has a light sensor module 20 for converting light from the light source 12 to digital image signals. The light sensor module 20 has a lens 22 and a charge coupled device (CCD) 24. Light is directed to the light sensor module 20 by three light guides 26.

A common problem is scratches or dust on one, or more, of the light guides 26, which leads to poor scan quality, examples including, but not limited to, shadows or stripes on the output image.

SUMMARY OF THE INVENTION

It is therefore a primary objective of the present invention to provide a method of image scanning that increases the probability of a quality scan.

In a preferred embodiment, the present invention provides a method of image scanning used in a scanner. The scanner comprises a light source for illuminating a document to be scanned, and a scanning module for scanning the document. The scanning module comprises a light sensor module for receiving light from the document and generating an image signal of the document, and a light delivery module for delivering the light to the light sensor module. The light sensor module is capable of moving in a single direction, and it may be positioned on at least a first and second position. The method comprises:

At the first position, using the light source and the scanning module to obtain a first reference image signal by scanning a reference picture;

at the second position, using the light source and the scanning module to obtain a second reference image signal by scanning a reference picture;

according to the first and second reference image signals, positioning the light sensor module on either the first position or the second position; and scanning the document;

wherein if flawed areas in the first reference image signal are fewer than flawed areas in the second reference image signal, the light sensor module is positioned on the first position to scan the document, and if flawed areas on the second reference image signal are fewer than flawed areas on the first reference image signal, the light sensor module is positioned on the second position to scan the document.

It is an advantage of the present invention that the probability of a quality scan is increased.

These and other objectives and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
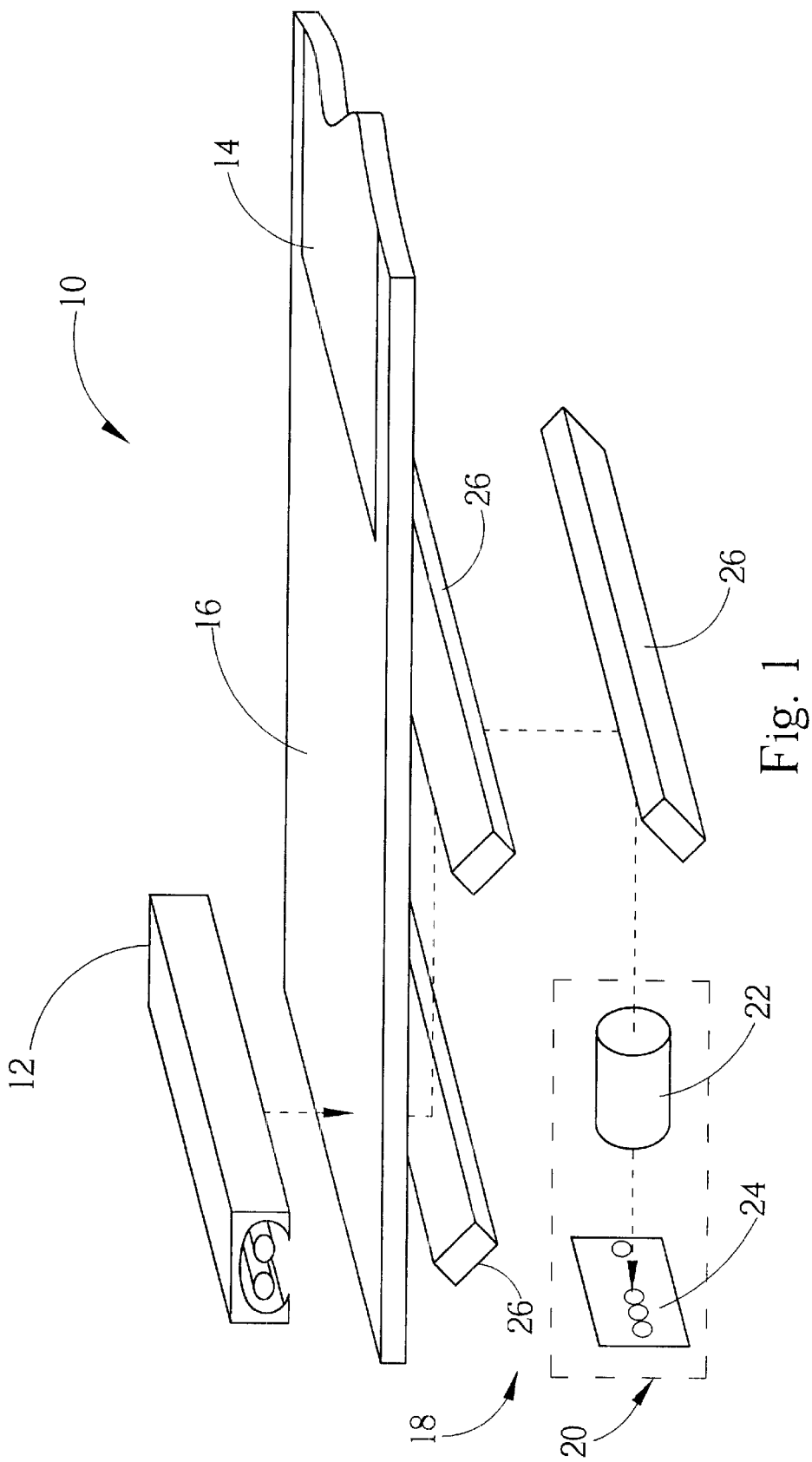
FIG. 1 is a diagram of a prior art scanner.
Figure 2:
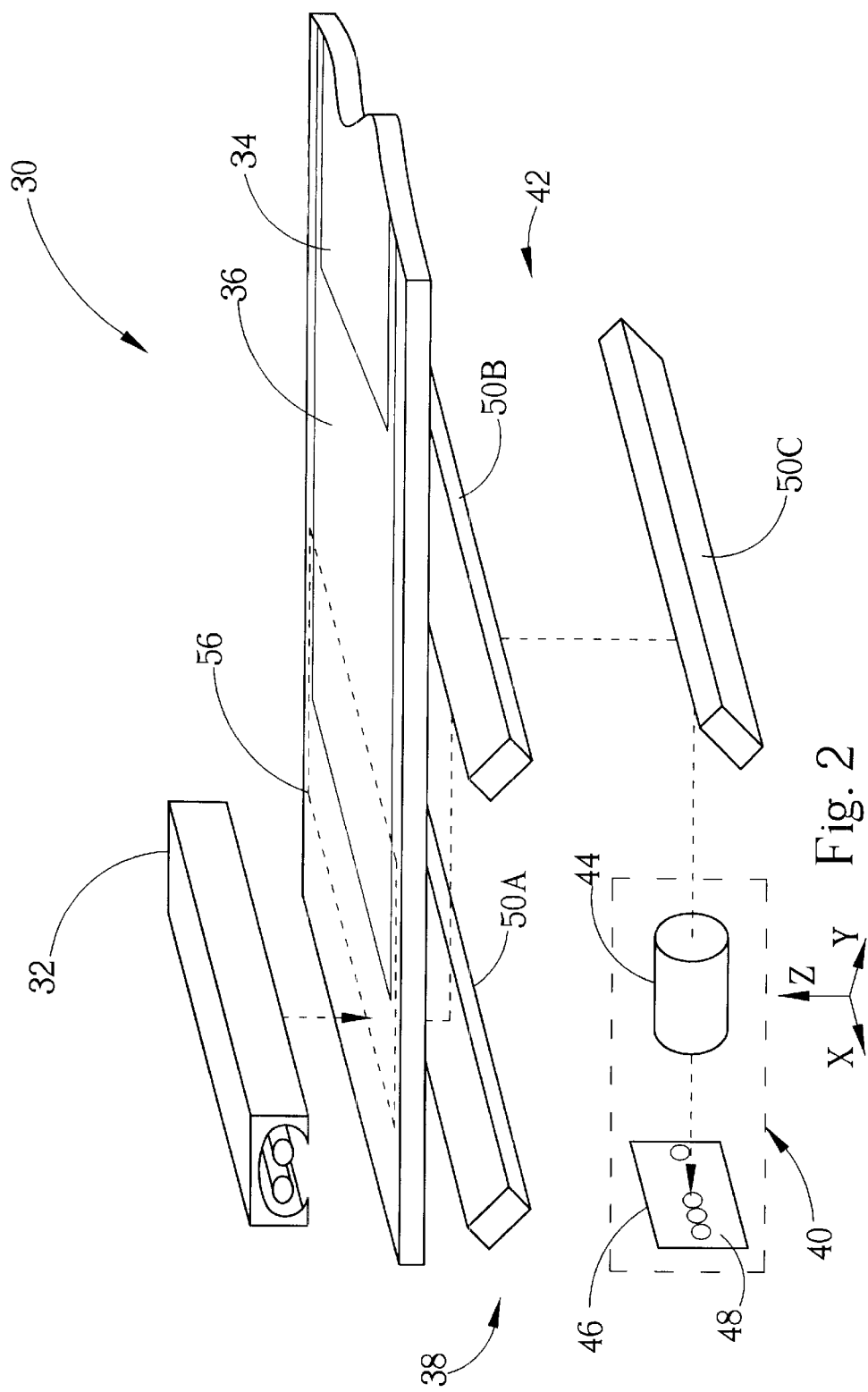
FIG. 2 is a diagram of a present invention scanner.
Figure 3:
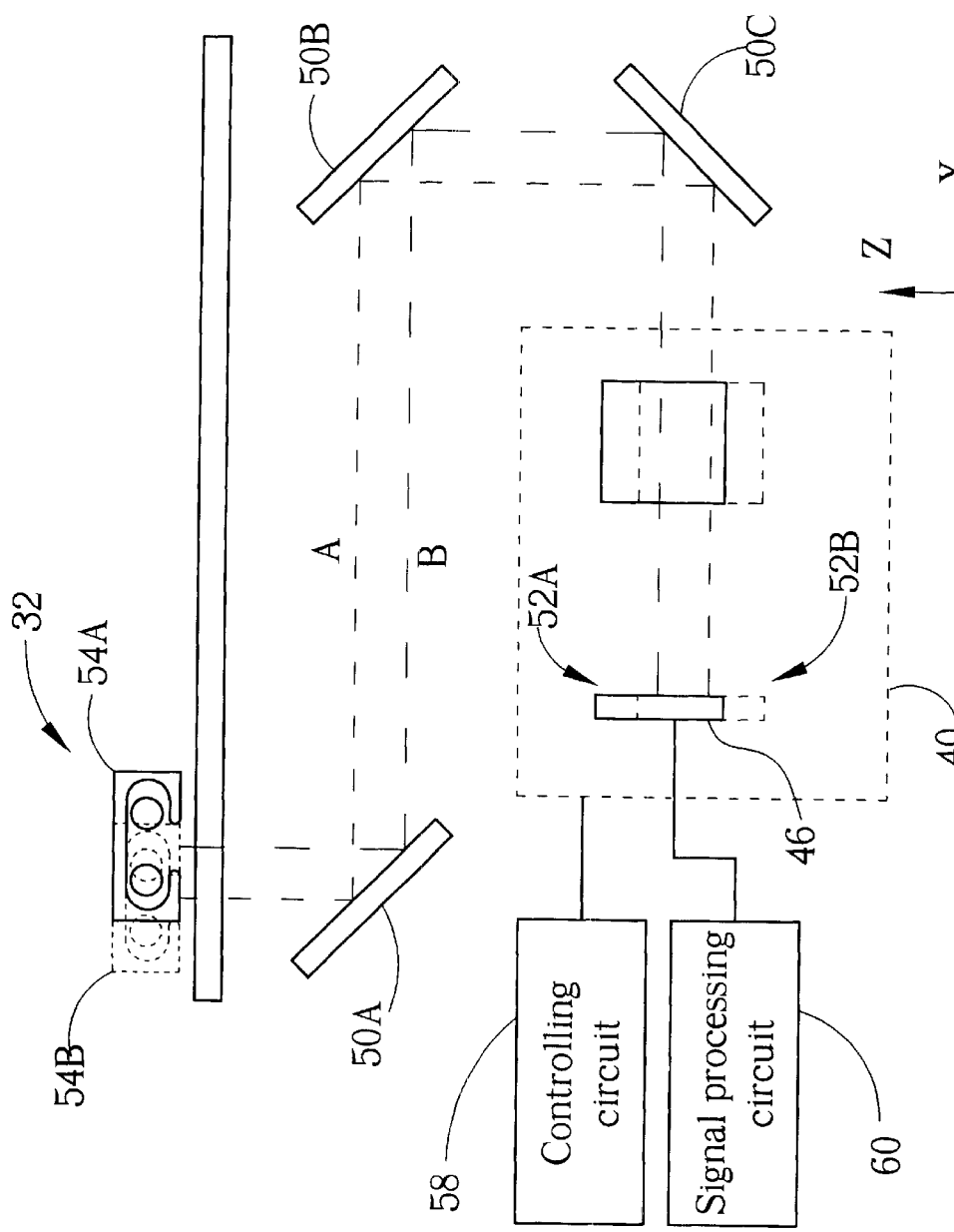
FIG. 3 is a diagram of a light path shown in FIG. 2.

Please refer to FIG. 2 and FIG. 3. FIG. 2 is a perspective diagram of a present invention scanner 30. FIG. 3 is a diagram of a light path shown in FIG. 2. The scanner 30 has a light source 32, beneath which is a transparent panel 36, where a document 34 rests, beneath which is a scanning module 38. When performing a scan, the light source 32 moves simultaneously with the scanning module 38 to scan the document 34.

As shown in FIG. 2, the scanning module 38 has a light sensor module 40, and a light delivery module 42. The light sensor module 40 has a lens set 44 and a charge coupled device (CCD) 46. The charge coupled device 46 has a plurality of linearly arranged light sensors 48. The light delivery module 42 has three light guides 50A, 50B, 50C.

From FIG. 3, a controlling circuit 58 is electrically connected to the scanning module 38. This circuit controls operations of the scanning module 38, the light sensor module 40, and the light source 32.

As shown in FIG. 2 and FIG. 3, incoming light is referenced to the Y-direction. The light sensor module 40 is capable of moving in directions vertical to the direction of incoming light, i.e. the X-Z plane. From FIG. 3, the light sensor module 40 may be positioned on at least a first position 52A and a second position 52B. When the light sensor module 40 is positioned on the first position 52A, the light source 32 is positioned on a corresponding first illuminating position 54A. When the light sensor module 40 is positioned on the second position 52B, the light source 32 is positioned on a corresponding second illuminating position 54B.

As shown in FIG. 2, the scanner 30 has a reference image 56. The reference image 56 is not only capable of acting as an image used for calibration in a prior art scanner but is also capable of acting as a known image. Before scanning the document 34, the scanner 30 scans the reference image 56 twice, once at each position 52A and 52B, obtaining two reference image signals.

As shown in FIG. 3, light is transmitted to the light sensor module 40 along two light paths A and B. Light path A denotes the path of light corresponding to the light sensor module 40 being positioned at the first position 52A, and the light source 32 being positioned at the first illuminating position 54A. Light path B denotes the path of light corresponding to the light sensor module 40 being positioned at the second position 52B, and the light source 32 being positioned at the first illuminating position 54B. The light passes through different areas on the light guides 50A, 50B, and 50C, depending on the position of the light source 32 and the light sensor module 40.

A signal processing circuit 60 electrically connected to the charge coupled device 46 analyzes the incoming image signals.

Figure 4:
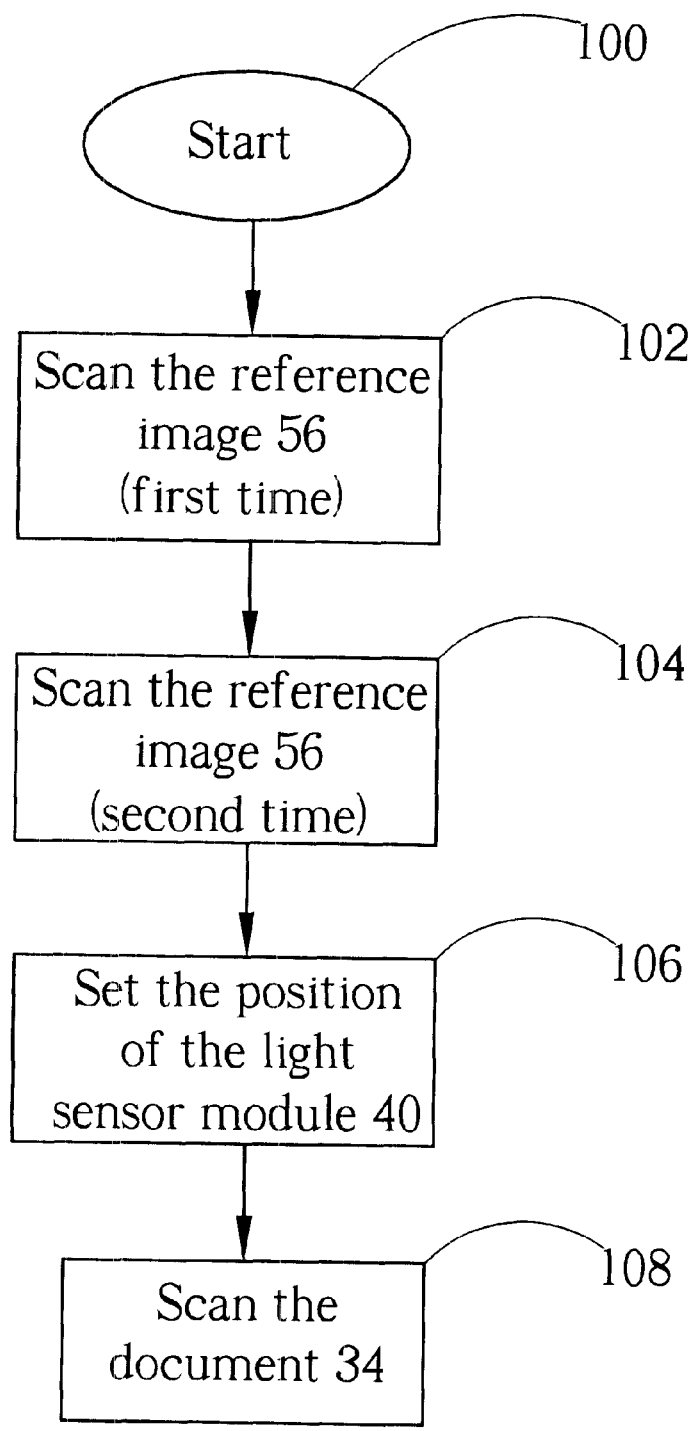
FIG. 4 is a flow chart of scanning procedures of a first preferred embodiment scanner shown in FIG. 2.
Figure 5:
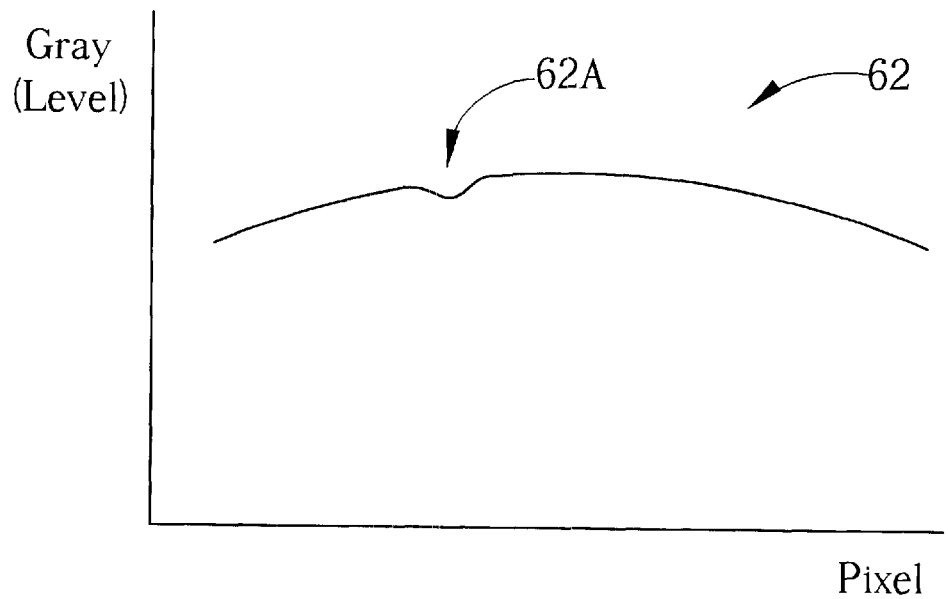
FIG. 5 is a first diagram of a first reference image signal obtained by a light sensor module positioned at a first position shown in FIG. 2.
Figure 6:
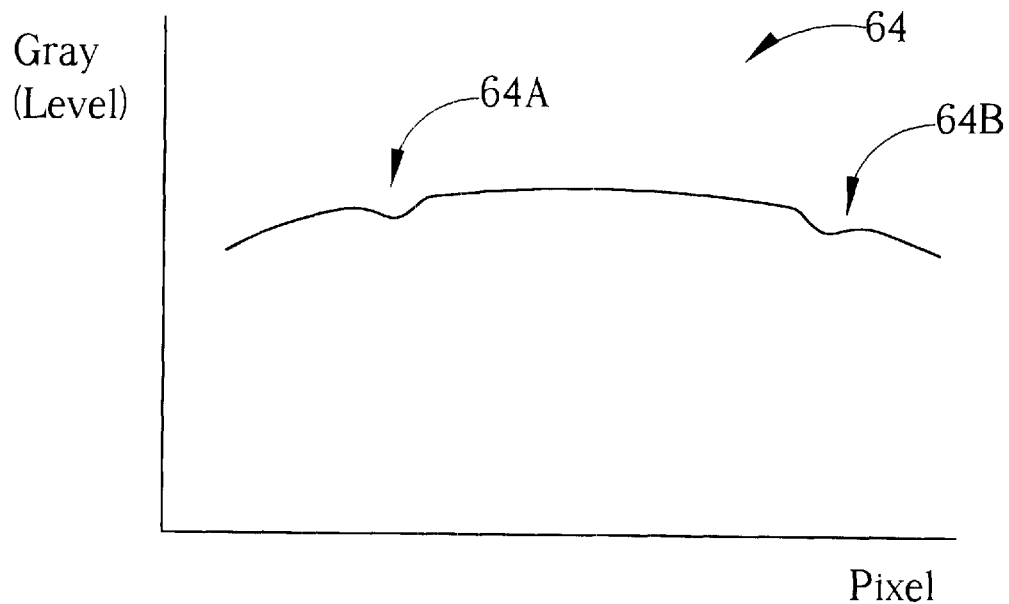
FIG. 6 is a first diagram of a second reference image signal obtained by the light sensor module positioned at a second position shown in FIG. 2.

Please refer to FIG. 4 to FIG. 6. FIG. 4 is a flow chart of scanning procedures of a first preferred embodiment scanner 30 shown in FIG. 2. FIG. 5 is a diagram of a first reference image signal 62 obtained by following the flow chart shown in FIG. 4. FIG. 6 is a diagram of a second reference image signal obtained by following the flow chart shown in FIG. 4. The first preferred embodiment of the present invention scanning method is:

Step 100: Start the scan process.

Step 102: Position the light sensor module 40 at the first position 52A, position the light source 32 at the first illuminating position 54A, and use the light source 32 and the scanning module 38 to scan the reference image 36 to obtain the first reference image signal 62.

Step 104: Position the light sensor module 40 at the second position 52B, position the light source 32 at the second illuminating position 54B, and use the light source 32 and the scanning module 38 to scan the reference image 36 to obtain the second reference image signal 64.

Step 106: Position the light sensor module 40 at the first position 52A or the second position 52B, and position the light source 32 at the corresponding first illuminating position 54A or the second illuminating position 54B, according to the number of flawed areas detected in the first and the second reference image signals 62, 64.

Step 108: Scan the document 34 to be scanned, and output the final image signal.

As mentioned above, the controlling circuit 58 positions the light sensor module 40 at the first position 52A and the second position 52B, and positions the light source 32 at the corresponding first and second illuminating positions 54A and 54B. The controlling circuit 58 scans the reference image 56 twice, obtaining the first and the second reference image signal 62, 64, respectively. Next, the signal processing circuit 60 analyzes the flawed areas in the first and the second reference image signals. If the flawed areas in the first reference image signal 62 are fewer than the flawed areas in the second reference image signal 64, the light sensor module 40 is positioned on the first position 52A, and the light source 32 is positioned on the corresponding first illuminating position 54A. If the flawed areas in the second reference image signal 64 are fewer than the flawed areas in the first reference image signal 62, the light sensor module 40 is positioned on the second position 52B, and the light source 32 is positioned on the corresponding second illuminating position 54B. The document is then scanned.

For example, as shown in FIG. 5 and FIG. 6, the first reference image signal 62 has a flawed area 62A, and the second reference image signal 64 has flawed areas 64A and 64B. Reference image signal 62 has fewer flawed areas than reference image signal 64 does. So, the controlling circuit 58 positions the light sensor module 40 on the first position 52A and positions the light source 32 on the corresponding first illuminating position 54A. Then, the document 34 is scanned. In this manner, scan quality is improved.

Figure 7:
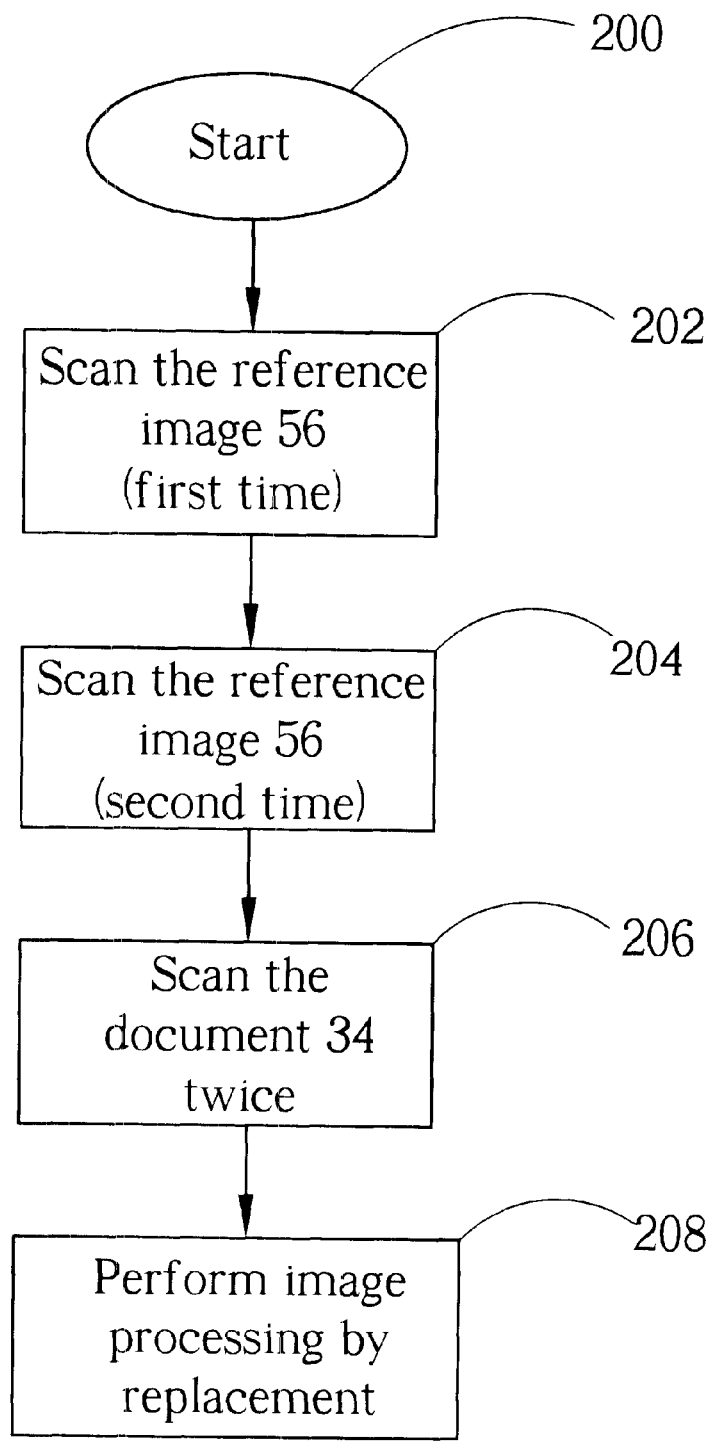
FIG. 7 is a flow chart of scanning procedures of a second preferred embodiment scanner shown in FIG. 2.
Figure 8:
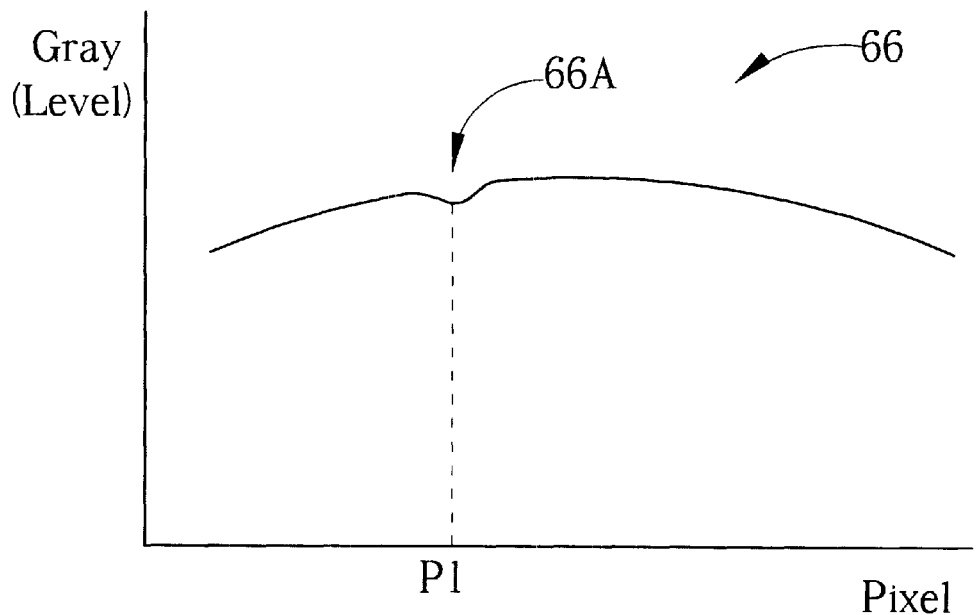
FIG. 8 is a second diagram of a first reference image signal obtained by the light sensor module positioned at the first position shown in FIG. 2.
Figure 9:
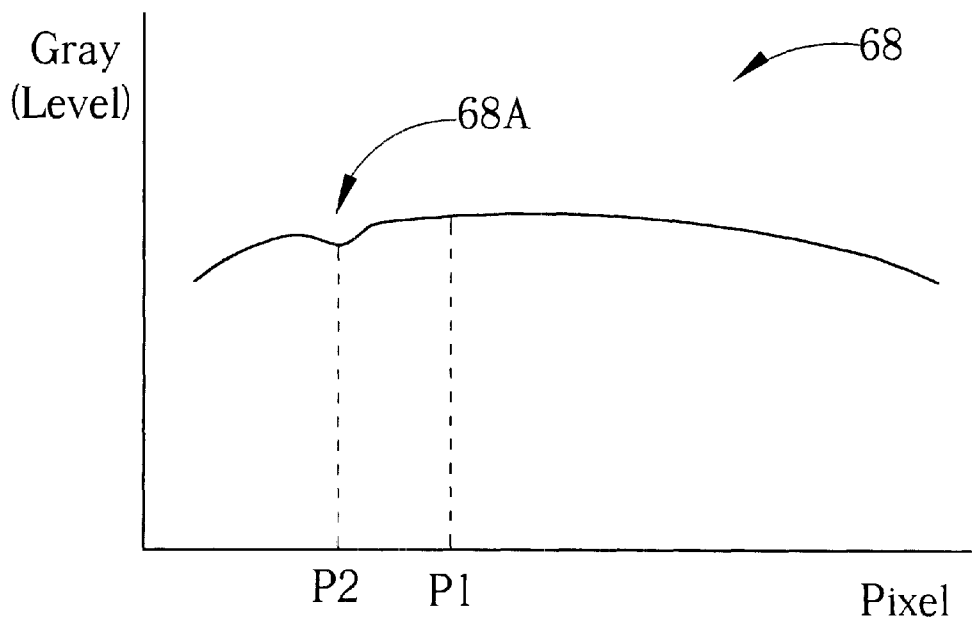
FIG. 9 is a second diagram of a second reference image signal obtained by the light sensor module positioned at the second position shown in FIG. 2.

Please refer to FIG. 7 to FIG. 9. FIG. 7 is a flow chart of scanning procedures of a second preferred embodiment scanner 30 shown in FIG. 2. FIG. 8 is a diagram of a first reference image signal 66 obtained by following the flow chart shown in FIG. 7. FIG. 9 is a diagram of a second reference image signal 68 obtained by following the flow chart shown in FIG. 7. The second preferred embodiment of the present invention scanning method is:

Step 200: Start the scan process.

Step 202: Position the light sensor module 40 at the first position 52A, position the light source 32 at the first illuminating position 54A, and use the light source 32 and the scanning module 38 to scan the reference image 56 to obtain the first reference image signal 66.

Step 204: Position the light sensor module 40 at the second position 52B, position the light source 32 at the second illuminating position 54B, and use the light source 32 and the scanning module 38 to scan the reference image 56 to obtain the second reference image signal 68.

Step 206: Scan the document 34 twice to obtain a first document image signal and a second document image signal.

Step 208: Perform image processing on the image signal obtained by scanning the document 34 that uses replacement to generate an output image from the first and the second reference image signals 66 and 68.

The controlling circuit 58 positions the light sensor module 40 at the first and the second position 52A and 52B, and positions the light source 32 at the corresponding first and second illuminating position 54A, 54B. The reference image 56 is scanned twice, obtaining the first and the second reference image signal 66 and 68, respectively. Next, the first and the second document image signals are scanned. The signal processing circuit 60 analyzes the flawed areas in the first and the second reference image signals 66, 68. The signal processing circuit 60 then performs image processing on the first document image signal according to the flawed areas in the first and the second reference image signals 66 and 68. When performing image processing, the signal processing circuit 60 replaces the image data of the flawed areas in the first document image signal with corresponding image data from the second document image signal.

For example, as shown in FIG. 8 and FIG. 9, a flawed area in the first reference image signal 66 is 66A, at a position P1, and that a flawed area in the second reference image signal 68 is 68A, at a position P2. The signal processing circuit 60 replaces the image data at P1 in the first document image signal with the image data at P1 in the second document image signal. This improves scan quality.

Figure 10:
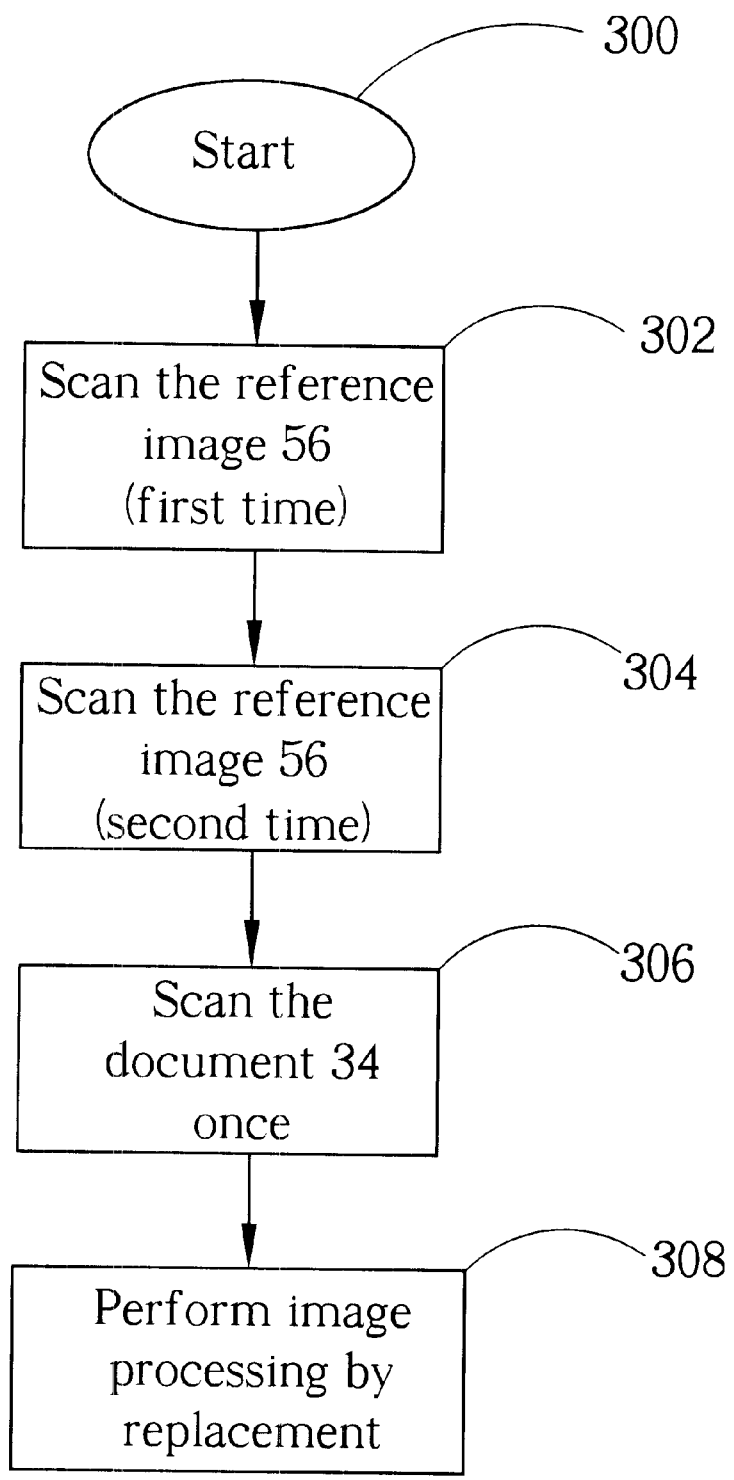
FIG. 10 is a flow chart of scanning procedures of a third preferred embodiment scanner shown in FIG. 2.

Please refer to FIG. 10. FIG. 10 is a flow chart of the scanning procedures of a third preferred embodiment scanner 30 shown in FIG. 2. The third preferred embodiment of the present invention scanning method is:

Step 300: Start the scan process.

Step 302: Position the light sensor module 40 at the first position 52A, position the light source 32 at the first illuminating position 54A, and use the light source 32 and the scanning module 38 to scan the reference image 56 to obtain the first reference image signal 66.

Step 304: Position the light sensor module 40 at the second position 52B, position the light source 32 at the second illuminating position 54B, and utilize the light source 32 and the scanning module 38 to scan the reference image 56 to obtain the second reference image signal 68.

Step 306: Scan the document 34 once to obtain a document image signal.

Step 308: Perform image processing on the image signal obtained from the scanned document 34 that performs corrections to generate an output image according to the first and the second reference image signals 66, 68.

In the preferred embodiment, after obtaining reference signals 66 and 68, the controlling circuit 58 only scans the document 34 once to obtain the document image signal. The signal processing circuit 60 creates a set of corrective parameters to perform the image processing step on the third document image according to the data of the flawed areas in the first and second reference image signal 66, 68. There are many methods of prior art parameter image processing, such as averages, trend forecasting, etc. Actually, having just obtained the first and the second reference image signals 66, 68 according to the methods of the present invention, the third document image is capable of using the method of the prior art image processing to improve scan quality.

The above light sensor module 40 and light source 32 are not limited to two positions. Designers can design the light sensor module 40 and the light source 32 to be fixed at two or more positions according to the design. Additionally, the light source 32 that is capable of be fixed on at least two positions can be replaced by a lighter, fixed light source. As long as the light sensor module 40 can be positioned at two or more positions, light from different paths can be received, and the effect of the present invention is achieved.

Again, the preferred embodiment above is described for the case of a transmission scanner, i.e. the light source 32 is above the transparent panel 36, and light transmitted through the document 34 is utilized to scan the document 34. In fact, the scanning method of the present invention can be used in a reflection scanner, i.e. the light source 32 is under the transparent panel 36, and light reflected from the document 34 is utilized to scan the document 34. In either case, the objective of the present invention is still achieved.

In addition, the first and second steps 102, 104, 202, 204, 302, 304 of the present invention for scanning reference image 56 can be combined with monochrome (or chromatic) calibration methods of the prior art scanner. In general, before the prior art scanner formally performs the document scan, it usually first performs a monochrome (or chromatic) calibration. Calibration is performed by scanning a monochrome (or chromatic) reference image to obtain the monochrome (or chromatic) reference image signals to supply information needed by the monochrome (or chromatic) calibration unit. Therefore, the first and second reference signals 66 and 68 can be obtained directly during calibration scans of the prior art.

In contrast to the scanning method of the prior art scanner 10, the present invention scanning method can position the light sensor module 40 at different positions. The scanner then decides the best position at which to scan the document, or it can use the information from the reference signals to perform image processing on the final document scan. In this manner, shadows and stripes on the final output, due to scratches or dust on the light guide, can be reduced, and the probability of a good scan is increased.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of image scanning used in a scanner, the scanner having a light source for illuminating a document to be scanned, and a scanning module for scanning the document, the scanning module having a light sensor module for receiving light from the document and generating an image signal of the document, and a light delivery module for delivering the light to the light sensor module, the light sensor module capable of moving along a first direction and capable of being positioned on at least a first position and a second position, the method comprising:

positioning the light sensor module on the first position, and using the light source and the scanning module to scan a reference picture to obtain a first reference image signal;

positioning the light sensor module on the second position, and using the light source and the scanning module to scan the reference picture to obtain a second reference image signal;

positioning the light sensor module on the first position or the second position according to the first and the second reference image signals; and scanning the document;

wherein if flawed areas in the first reference image signal are fewer than flawed areas in the second reference image signal, the light sensor module is positioned on the first position to scan the document, and if flawed areas on the second reference image signal are fewer than flawed areas on the first reference image signal, the light sensor module is positioned on the second position to scan the document.

2. The method of claim 1 wherein the light sensor module comprises a lens set for receiving light from the light delivery module and a charge coupled device (CCD) for converting light from the lens set to the image signal of the document.

3. The method of claim 2 wherein the charge coupled device comprises a plurality of linearly arranged light sensors.

4. The method of claim 2 wherein the light delivery module comprises at least a light guide for reflecting light from the document to the light sensor module.

5. The method of claim 1 wherein when the light sensor module is positioned on the first position, the light source is positioned on a corresponding first illuminating position, and when the light sensor module is positioned on the second position, the light source is positioned on a corresponding second illuminating position.

6. The method of claim 1 wherein light reflected from the document is utilized to generate the image signal.

7. The method of claim 1 wherein light transmitted through the document is utilized to generate the image signal.

8. The method of claim 1 wherein the scanner further comprises a controlling circuit electrically connected to the scanning module for controlling operations of the scanning module and the light sensor module.

9. The method of claim 1 wherein the scanner further comprises a signal processing circuit electrically connected to the light sensor module for analyzing the flawed areas in the first and the second reference image signals.

10. A method of image scanning used in a scanner, the scanner having a light source for illuminating a document that is to be scanned, and a scanning module for scanning the document, the scanning module having a light sensor module for receiving light from the document and generating an image signal of the document, and a light delivery module for delivering the light to the light sensor module, the light sensor module capable of moving along a first direction and capable of being positioned on at least a first position and a second position, the method comprising:

positioning the light sensor module on the first position, and using the light source and the scanning module to scan a reference picture to obtain a first reference image signal;

positioning the light sensor module on the second position, and using the light source and the scanning module to scan the reference picture to obtain a second reference image signal;

scanning the document; and utilizing the first and the second reference image signals to perform an image processing step upon the image signals obtained from the document to generate an output image.

11. The method of claim 10 wherein the light sensor module comprises a lens set for receiving light from the light delivery module, and a charge coupled device (CCD) for converting light from the lens set into the image signal of the document.

12. The method of claim 11 wherein the charge coupled device comprises a plurality of linearly arranged light sensors.

13. The method of claim 10 wherein the light delivery module comprises at least a reflective surface for reflecting light from the document to the light sensor module.

14. The method of claim 10 wherein the scanner further comprises a controlling circuit electrically connected to the scanning module for controlling operations of the scanning module and the light sensor module, and a signal processing circuit electrically connected to the light sensor module for analyzing flawed areas in the first and the second reference image signals and performing the image processing step.

15. The method of claim 14 wherein the controlling circuit controls the scanning module to scan the document twice and obtain a first document image signal and a second document image signal, and the signal processing circuit performs the image processing step on the first document image signal according to the flawed areas in the first and the second reference image signals, and data from the second document image signal.

16. The method of claim 15 wherein when performing the image processing step on the first document image signal, the image processing circuit replaces flawed areas in the first document image signal with corresponding image data from the second document image signal.

17. The method of claim 14 wherein the controlling circuit controls the scanning module to scan the document once to obtain a third document image signal, and the signal processing circuit creates a set of corrective parameters to perform the image processing step on the third document image according to the flawed areas in the first and the second reference image signals.

18. The method of claim 10 wherein when the light sensor module is positioned on the first position, the light source is positioned on a corresponding first illuminating position, and when the light sensor module is positioned on the second position, the light source is positioned on a corresponding second illuminating position.

19. The method of claim 10 wherein light reflected from the document is utilized to generate the image signal.

20. The method of claim 10 wherein light transmitted through the document is utilized to generate the image signal.

21. The method of claim 10 wherein the light sensor comprises a plurality of linearly arranged light detectors.

* * * * *